(12) United States Patent
Li et al.

(10) Patent No.: US 10,375,600 B2
(45) Date of Patent: Aug. 6, 2019

(54) DATA RETRANSMISSION METHOD, DEVICE, AND SYSTEM

(71) Applicant: Huawei Technologies Co., Ltd., Shenzhen (CN)

(72) Inventors: Xiaocui Li, Beijing (CN); Jian Wang, Beijing (CN); Da Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/556,072

(22) PCT Filed: Apr. 9, 2015

(86) PCT No.: PCT/CN2015/076129
§ 371 (c)(1),
(2) Date: Sep. 6, 2017

(87) PCT Pub. No.: WO2016/161584
PCT Pub. Date: Oct. 13, 2016

(65) Prior Publication Data
US 2018/0213437 A1 Jul. 26, 2018

(51) Int. Cl.
*H04W 28/04* (2009.01)
*H04L 29/08* (2006.01)
(Continued)

(52) U.S. Cl.
CPC .......... *H04W 28/04* (2013.01); *H04L 1/1812* (2013.01); *H04L 27/0006* (2013.01);
(Continued)

(58) Field of Classification Search
CPC .... H04W 28/04; H04W 16/14; H04L 1/1812; H04L 27/0006; H04L 29/08; H04L 5/0044
See application file for complete search history.

(56) References Cited

U.S. PATENT DOCUMENTS 8,509,168 B2 * 8/2013 Kim ...................... H04L 1/0026
370/329
2014/0036889 A1 2/2014 Kim et al.
(Continued)

FOREIGN PATENT DOCUMENTS

CN 101615992 A 12/2009
CN 102045841 A 5/2011
(Continued)

OTHER PUBLICATIONS

Machine Translation and Abstract of Chinese Publication No. CN101615992, Dec. 30, 2009, 29 pages.
(Continued)

*Primary Examiner* — Rina C Pancholi
(74) *Attorney, Agent, or Firm* — Conley Rose, P.C.

(57) ABSTRACT

A data retransmission method includes transmitting, by a first device, data to a second device by using a first carrier. The first carrier is an unlicensed carrier. The method additionally includes retransmitting, by the first device, the data to the second device by using a second carrier. The first carrier and the second carrier are different carriers. The method additionally includes sending, by the first device, control signaling to the second device. The control signaling is used to indicate the data.

12 Claims, 6 Drawing Sheets

(51) Int. Cl.
*H04L 1/18* (2006.01)
*H04W 16/14* (2009.01)
*H04L 27/00* (2006.01)
*H04L 5/00* (2006.01)

(52) U.S. Cl.
CPC ............. *H04L 29/08* (2013.01); *H04W 16/14* (2013.01); *H04L 5/0044* (2013.01)

(56) References Cited

U.S. PATENT DOCUMENTS

| | | | | |
|---|---|---|---|---|
| 2014/0335876 | A1* | 11/2014 | Ratasuk | H04W 16/14 455/450 |
| 2015/0163041 | A1* | 6/2015 | Kodali | H04L 1/1812 370/252 |
| 2015/0327233 | A1* | 11/2015 | Liu | H04W 56/0015 370/329 |
| 2015/0365931 | A1* | 12/2015 | Ng | H04L 1/1812 370/329 |
| 2017/0126365 | A1* | 5/2017 | Peng | H04L 1/1822 |

FOREIGN PATENT DOCUMENTS

| | | |
|---|---|---|
| CN | 104094623 A | 10/2014 |
| WO | 2013087835 A1 | 6/2013 |

OTHER PUBLICATIONS

Machine Translation and Abstract of Chinese Publication No. CN102045841, May 4, 2011, 32 pages.
Foreign Communication From a Counterpart Application, PCT Application No. PCT/CN2015/076129, English Translation of International Search Report dated Jan. 14, 2016, 2 pages.
Foreign Communication From a Counterpart Application, PCT Application No. PCT/CN2015/076129, English Translation of Written Opinion dated Jan. 14, 2016, 6 pages.
Huawei, et al., "HARQ design for LAA," XP050951365, R1-151120, Mar. 24-26, 2015, 5 pages.
ZTE, "HARQ related issues for Licensed-assisted access using LTE," XP050951397, R1-151023, Mar. 24-26, 2015, 4 pages.
Foreign Communication From a Counterpart Application, European Application No. 15888141.7, Extended European Search Report dated Feb. 26, 2018, 10 pages.
Machine Translation and Abstract of Chinese Publication No. CN104094623, Oct. 8, 2014, 17 pages.
"3rd Generation Partnership Project; Technical Specification Group Radio Access Network; Evolved Universal Terrestrial Radio Access (E-UTRA); Physical layer procedures (Release 11)," 3GPP TS 36.213, V11.2.0, Feb. 2013, 173 pages.
"3rd Generation Partnership Project; Technical Specification Group Radio Access Network; Evolved Universal Terrestrial Radio Access (E-UTRA); Multiplexing and channel coding (Release 11)," 3GPP TS 36.212, V11.2.0, Feb. 2013, 82 pages.

* cited by examiner

| | | |
|---|---|---|
| 0 | ////// | |
| 1 | ////// | |
| 2 | ////// | |
| 3 | ////// | |
| 4 | a | QPSK |
| 5 | ////// | |
| 6 | ////// | |
| 7 | ////// | |
| 8 | ////// | |
| 9 | ////// | |
| 10 | ////// | |
| 11 | b | 16QAM |
| 12 | ////// | |
| 13 | ////// | |
| 14 | c | 64QAM |
| 15 | ////// | |
| 16 | ////// | |
| 17 | ////// | |
| 18 | ////// | |
| 19 | ////// | |
| 20 | ////// | |
| 21 | ////// | |
| 22 | d | 256QAM |
| 23 | ////// | |
| 24 | ////// | |
| 25 | ////// | |
| 26 | ////// | |
| 27 | ////// | |
| 28 | | QPSK |
| 29 | | 16QAM |
| 30 | | 64QAM |
| 31 | | 256QAM |

FIG. 2

| | | |
|---|---|---|
| 0 | Carrier 1 | |
| 1 | Carrier 2 | |
| 2 | Carrier 3 | |
| 3 | Carrier 4 | QPSK |
| 4 | Carrier 5 | |
| 5 | Carrier 6 | |
| 6 | Carrier 7 | |
| 7 | Carrier 1 | |
| 8 | Carrier 2 | |
| 9 | Carrier 3 | |
| 10 | Carrier 4 | 16QAM |
| 11 | Carrier 5 | |
| 12 | Carrier 6 | |
| 13 | Carrier 7 | |
| 14 | Carrier 1 | |
| 15 | Carrier 2 | |
| 16 | Carrier 3 | |
| 17 | Carrier 4 | 64QAM |
| 18 | Carrier 5 | |
| 19 | Carrier 6 | |
| 20 | Carrier 7 | |
| 21 | Carrier 1 | |
| 22 | Carrier 2 | |
| 23 | Carrier 3 | |
| 24 | Carrier 4 | 256QAM |
| 25 | Carrier 5 | |
| 26 | Carrier 6 | |
| 27 | Carrier 7 | |
| 28 | | QPSK |
| 29 | | 16QAM |
| 30 | | 64QAM |
| 31 | | 256QAM |

FIG. 3

DATA RETRANSMISSION METHOD, DEVICE, AND SYSTEM

CROSS-REFERENCE TO RELATED APPLICATION

This application is a national stage of International Application No. PCT/CN2015/076129, filed on Apr. 9, 2015, which is hereby incorporated by reference in its entirety.

TECHNICAL FIELD

The present disclosure relates to the communications field, and in particular, to a data retransmission method, a device, and a system.

BACKGROUND

In a wireless communications network, devices need to transmit information by using a frequency resource. The frequency resource is also referred to as a spectrum. The spectrum may be classified into a licensed spectrum and an unlicensed spectrum. The licensed spectrum is a frequency resource exclusive to some operators. The unlicensed spectrum is a common frequency resource in the wireless communications network. With development of communications technologies, an amount of information transmitted in the wireless communications network gradually increases. Preempting the unlicensed spectrum to transmit information may improve a data throughput in the wireless communications network, and better satisfy a user requirement.

In the prior art, to improve reliability of radio channel transmission, a Hybrid Automatic Repeat Request (HARQ) is widely used as a primary data retransmission method. For example, after a first device sends data to a second device, the second device feeds back an Acknowledgement/Negative Acknowledgement (ACK/NACK) message to the first device, and the first device determines whether to retransmit the data to the second device, according to the feedback information of the second device. If the data is required, the data is retransmitted. Such a data transmission process is an HARQ process.

For example, in a Licensed-Assisted Access Using Long Term Evolution (LAA LTE) system, when a sending device transmits data by using an unlicensed carrier, the sending device cannot always occupy a channel. Therefore, after the sending device occupies the unlicensed carrier for a particular time, the sending device needs to re-preempt a channel. Consequently, retransmission of the HARQ is interrupted and a receive end can receive the data only after the sending device re-preempts a channel. How to implement HARQ retransmission using an unlicensed carrier becomes a problem to be resolved urgently.

SUMMARY

Embodiments of the present disclosure provide a data retransmission method, a device, and a system, to resolve a prior-art problem that when a device transmits data by using an unlicensed carrier, data retransmission cannot be performed because the device needs to re-preempt a channel.

To achieve the foregoing objective, the following technical solutions are used in the embodiments of the present disclosure.

According to a first aspect, an embodiment of the present disclosure provides a data retransmission method, including:

transmitting, by a first device, data to a second device by using a first carrier, where the first carrier is an unlicensed carrier;

retransmitting, by the first device, the data to the second device by using a second carrier, where the first carrier and the second carrier are different carriers; and sending, by the first device, control signaling to the second device, where the control signaling is used to indicate the data.

With reference to the first aspect, in a first possible implementation of the first aspect, the control signaling includes a modulation and coding scheme (MCS) field, and when a value of the MCS field is any value in [0, 31−N], the MCS field is used to indicate the data, where N is a quantity of preset modulation schemes and is a positive integer.

With reference to the first possible implementation of the first aspect, in a second possible implementation of the first aspect, in all values in [0, 31−N], $N_1$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number.

With reference to the first aspect, in a third possible implementation of the first aspect, the control signaling includes a carrier indicator field (CIF), where the CIF is used to indicate the data, and the control signaling further includes an MCS field, where the MCS field is used to indicate a modulation scheme for retransmitting the data.

With reference to the third possible implementation of the first aspect, in a fourth possible implementation of the first aspect, a value of the MCS field is any value in [0, 31−N], each value is used to indicate a modulation scheme of N preset modulation schemes, and N is a positive integer.

With reference to any one of the first aspect to the fourth possible implementation of the first aspect, in a fifth possible implementation of the first aspect, the second carrier is a licensed carrier or an unlicensed carrier.

With reference to any one of the first aspect to the fifth possible implementation of the first aspect, in a sixth possible implementation of the first aspect, the sending, by the first device, control signaling to the second device includes: sending, by the first device, the control signaling to the second device by using the second carrier.

According to a second aspect, an embodiment of the present disclosure provides a data retransmission method, including:

receiving, by a second device, data that is transmitted by a first device by using a first carrier, where the first carrier is an unlicensed carrier;

receiving, by the second device, the data that is retransmitted by the first device by using a second carrier, where the first carrier and the second carrier are different carriers; and receiving, by the second device, control signaling sent by the first device, where the control signaling is used to indicate the data.

With reference to the second aspect, in a first possible implementation of the second aspect, the control signaling includes an MCS field, and when a value of the MCS field is any value in [0, 31−N], the MCS field is used to indicate the data, where N is a quantity of preset modulation schemes and is a positive integer.

With reference to the first possible implementation of the second aspect, in a second possible implementation of the second aspect, in all values in [0, 31−N], $N_1$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number.

With reference to the second aspect, in a third possible implementation of the second aspect, the control signaling includes a CIF, where the CIF is used to indicate the data, and the control signaling further includes an MCS field, where the MCS field is used to indicate a modulation scheme for retransmitting the data.

With reference to the third possible implementation of the second aspect, in a fourth possible implementation of the second aspect, a value of the MCS field is any value in [0, 31−N], each value is used to indicate a modulation scheme of N preset modulation schemes, and N is a positive integer.

With reference to any one of the second aspect to the fourth possible implementation of the second aspect, in a fifth possible implementation of the second aspect, the second carrier is a licensed carrier or an unlicensed carrier.

With reference to any one of the second aspect to the fifth possible implementation of the second aspect, in a sixth possible implementation of the second aspect, the receiving, by the second device, control signaling sent by the first device includes: receiving, by the second device, the control signaling that is sent by the first device by using the second carrier.

According to a third aspect, an embodiment of the present disclosure provides a first device, including:

a first sending unit, configured to transmit data to a second device by using a first carrier, where the first carrier is an unlicensed carrier;

a retransmission unit, configured to retransmit the data to the second device by using a second carrier, where the first carrier and the second carrier are different carriers; and a second sending unit, configured to send control signaling to the second device, where the control signaling is used to indicate the data.

With reference to the third aspect, in a first possible implementation of the third aspect, the control signaling includes an MCS field, and when a value of the MCS field is any value in [0, 31−N], the MCS field is used to indicate the data, where N is a quantity of preset modulation schemes and is a positive integer.

With reference to the first possible implementation of the third aspect, in a second possible implementation of the third aspect, in all values in [0, 31−N], $N_i$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number.

With reference to the third aspect, in a third possible implementation of the third aspect, the control signaling includes a CIF, where the CIF is used to indicate the data, and the control signaling further includes an MCS field, where the MCS field is used to indicate a modulation scheme for retransmitting the data.

With reference to the third possible implementation of the third aspect, in a fourth possible implementation of the third aspect, a value of the MCS field is any value in [0, 31−N], each value is used to indicate a modulation scheme of N preset modulation schemes, and N is a positive integer.

With reference to any one of the third aspect to the fourth possible implementation of the third aspect, in a fifth possible implementation of the third aspect, the second carrier is a licensed carrier or an unlicensed carrier.

With reference to any one of the third aspect to the fifth possible implementation of the third aspect, in a sixth possible implementation of the third aspect, the second sending unit is specifically configured to send the control signaling to the second device by using the second carrier.

According to a fourth aspect, an embodiment of the present disclosure provides a second device, including:

a first receiving unit, configured to receive data that is transmitted by a first device by using a first carrier, where the first carrier is an unlicensed carrier;

a second receiving unit, configured to receive the data that is retransmitted by the first device by using a second carrier, where the first carrier and the second carrier are different carriers; and a third receiving unit, configured to receive control signaling sent by the first device, where the control signaling is used to indicate the data.

With reference to the fourth aspect, in a first possible implementation of the fourth aspect, the control signaling includes an MCS field, and when a value of the MCS field is any value in [0, 31−N], the MCS field is used to indicate the data, where N is a quantity of preset modulation schemes and is a positive integer.

With reference to the first possible implementation of the fourth aspect, in a second possible implementation of the fourth aspect, in all values in [0, 31−N], $N_i$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number.

With reference to the fourth aspect, in a third possible implementation of the fourth aspect, the control signaling includes a CIF, where the CIF is used to indicate the data, and the control signaling further includes an MCS field, where the MCS field is used to indicate a modulation scheme for retransmitting the data.

With reference to the third possible implementation of the fourth aspect, in a fourth possible implementation of the fourth aspect, a value of the MCS field is any value in [0, 31−N], each value is used to indicate a modulation scheme of N preset modulation schemes, and N is a positive integer.

With reference to any one of the fourth aspect to the fourth possible implementation of the fourth aspect, in a fifth possible implementation of the fourth aspect, the second carrier is a licensed carrier or an unlicensed carrier.

With reference to any one of the fourth aspect to the fifth possible implementation of the fourth aspect, in a sixth possible implementation of the fourth aspect, the third receiving unit is specifically configured to receive the control signaling that is sent by the first device by using the second carrier.

According to a fifth aspect, an embodiment of the present disclosure provides a first device, including a processor, a memory, a bus, and a transmitter, where the processor, the memory, and the transmitter are connected to and communicate with each other by using the bus;

the processor is configured to transmit, by using the transmitter, data to a second device by using a first carrier, where the first carrier is an unlicensed carrier;

the processor is further configured to retransmit, by using the transmitter, the data to the second device by using a second carrier, where the first carrier and the second carrier are different carriers; and the processor is further configured to send control signaling to the second device by using the transmitter, where the control signaling is used to indicate the data.

With reference to the fifth aspect, in a first possible implementation of the fifth aspect, the control signaling includes an MCS field, and when a value of the MCS field is any value in [0, 31−N], the MCS field is used to indicate the data, where N is a quantity of preset modulation schemes and is a positive integer.

With reference to the first possible implementation of the fifth aspect, in a second possible implementation of the fifth aspect, in all values in [0, 31−N], $N_i$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number.

With reference to the fifth aspect, in a third possible implementation of the fifth aspect, the control signaling includes a CIF, where the CIF is used to indicate the data, and the control signaling further includes an MCS field, where the MCS field is used to indicate a modulation scheme for retransmitting the data.

With reference to the third possible implementation of the fifth aspect, in a fourth possible implementation of the fifth aspect, a value of the MCS field is any value in [0, 31−N], each value is used to indicate a modulation scheme of N preset modulation schemes, and N is a positive integer.

With reference to any one of the fifth aspect to the fourth possible implementation of the fifth aspect, in a fifth possible implementation of the fifth aspect, the second carrier is a licensed carrier or an unlicensed carrier.

With reference to any one of the fifth aspect to the fifth possible implementation of the fifth aspect, in a sixth possible implementation of the fifth aspect, the processor is specifically configured to send, by using the transmitter, the control signaling to the second device by using the second carrier.

According to a sixth aspect, an embodiment of the present disclosure provides a second device, including a processor, a memory, a bus, and a receiver, where the processor, the memory, and the receiver are connected to and communicate with each other by using the bus;

the processor is configured to receive, by using the receiver, data that is transmitted by a first device by using a first carrier, where the first carrier is an unlicensed carrier;

the processor is further configured to receive, by using the receiver, the data that is retransmitted by the first device by using a second carrier, where the first carrier and the second carrier are different carriers; and the processor is further configured to receive, by using the receiver, control signaling sent by the first device, where the control signaling is used to indicate the data.

With reference to the sixth aspect, in a first possible implementation of the sixth aspect, the control signaling includes an MCS field, and when a value of the MCS field is any value in [0, 31−N], the MCS field is used to indicate the data, where N is a quantity of preset modulation schemes and is a positive integer.

With reference to the first possible implementation of the sixth aspect, in a second possible implementation of the sixth aspect, in all values in [0, 31−N], $N_i$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number.

With reference to the sixth aspect, in a third possible implementation of the sixth aspect, the control signaling includes a CIF, where the CIF is used to indicate the data, and the control signaling further includes an MCS field, where the MCS field is used to indicate a modulation scheme for retransmitting the data.

With reference to the third possible implementation of the sixth aspect, in a fourth possible implementation of the sixth aspect, a value of the MCS field is any value in [0, 31−N], each value is used to indicate a modulation scheme of N preset modulation schemes, and N is a positive integer.

With reference to any one of the sixth aspect to the fourth possible implementation of the sixth aspect, in a fifth possible implementation of the sixth aspect, the second carrier is a licensed carrier or an unlicensed carrier.

With reference to any one of the sixth aspect to the fifth possible implementation of the sixth aspect, in a sixth possible implementation of the sixth aspect, the processor is specifically configured to receive, by using the receiver, the control signaling that is sent by the first device by using the second carrier.

According to a seventh aspect, an embodiment of the present disclosure provides a wireless communications system, including a first device and a second device, where the first device is the first device according to the third aspect or any possible implementation of the third aspect, and the second device is the second device according to the fourth aspect or any possible implementation of the fourth aspect; or the first device is the first device according to the fifth aspect or any possible implementation of the fifth aspect, and the second device is the second device according to the sixth aspect or any possible implementation of the sixth aspect.

According to the data retransmission method, the device, and the system that are provided in the embodiments of the present disclosure, a first device transmits data to a second device by using a first carrier, where the first carrier is an unlicensed carrier; the first device retransmits the data to the second device by using a second carrier, where the first carrier and the second carrier are different carriers; and the first device sends control signaling to the second device, where the control signaling is used to indicate the data. The prior-art problem that when a device transmits data by using an unlicensed carrier, data retransmission cannot be performed because the device needs to re-preempt a channel is resolved.

BRIEF DESCRIPTION OF DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 2 is a schematic diagram of an MCS field according to an embodiment of the present disclosure;

FIG. 3 is a schematic diagram of another MCS field according to an embodiment of the present disclosure;

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be understood that the technical solutions of the embodiments of the present disclosure may be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), Universal Mobile Telecommunications System (UMTS), and a Worldwide Interoperability for Microwave Access (WiMAX) communications system.

It should be understood that in the embodiments of the present disclosure, a first device or a second device includes, but is not limited to, user equipment (UE), a mobile station (MS), a mobile terminal, a mobile telephone, a handset, a portable equipment, and the like. The user equipment may communicate with one or more core networks by using a radio access network (RAN). For example, the user equipment may be a mobile telephone (or referred to as a "cellular" phone), or a computer having a wireless communication function. The user equipment may further be a portable, pocket-sized, handheld, computer built-in, or in-vehicle mobile apparatus.

In the embodiments of the present disclosure, the first device or the second device may be a base transceiver station (BTS) in GSM or CDMA, or may be a NodeB (NodeB) in WCDMA, or may be an evolved NodeB (e-NodeB) in LTE. This is not limited in the embodiments of the present disclosure.

It should be understood that in the embodiments of the present disclosure, the "first" and the "second" are merely used for distinguishing, but are not intended to limit the embodiments of the present invention. When the first device is a base station, the second device may be user equipment, or when the first device is user equipment, the second device may be a base station, or when the first device is user equipment, the second device may be user equipment, to perform device-to-device communication. The embodiments of the present disclosure are not specifically limited thereto.

Figure 1:
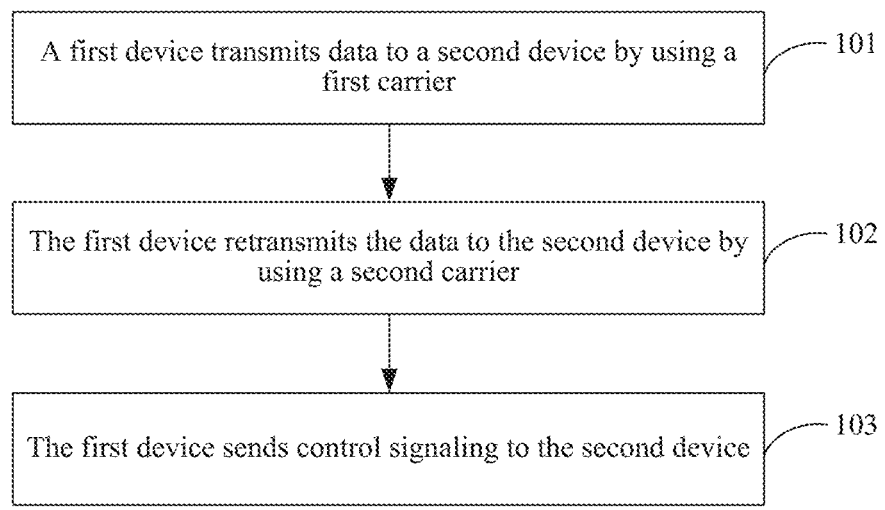
FIG. 1 is a schematic flowchart of a data retransmission method according to an embodiment of the present disclosure.

An embodiment of the present disclosure provides a data retransmission method. Preferably, the method is applied to an LAA-LTE system or an LTE system. Referring to FIG. 1, the method includes the following steps.

101: A first device transmits data to a second device by using a first carrier. The first carrier is an unlicensed carrier.

102: The first device retransmits the data to the second device by using a second carrier. The first carrier and the second carrier are different carriers.

Optionally, the second carrier may be a licensed carrier or an unlicensed carrier. Optionally, because the first device cannot always occupy an unlicensed carrier, after the first device occupies the unlicensed carrier for a particular time, the first device needs to re-preempt an unlicensed carrier. The first device may retransmit the data on the second carrier when the first device cannot retransmit the data on the first carrier, or the first device may retransmit the data on the second carrier when the first device still occupies the first carrier. This is not limited in the present disclosure.

103: The first device sends control signaling to the second device. The control signaling is used to indicate the data. Preferably, the first device may send the control signaling to the second device by using the second carrier.

Optionally, in an application scenario, the control signaling includes an MCS field, and when a value of the MCS field is any value in [0, 31−N], the MCS field is used to indicate the data, where N is a quantity of preset modulation schemes and is a positive integer.

Further, optionally, in all values in [0, 31−N], $N_1$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number.

Alternatively, optionally, in another application scenario, the control signaling includes a CIF. The CIF is used to indicate the data. The control signaling further includes an MCS field. The MCS field is used to indicate a modulation scheme for retransmitting the data. Optionally, the CIF is used to indicate a number of the first carrier, that is, used to represent which carrier the data is from.

Further, optionally, a value of the MCS field is any value in [0, 31−N], each value is used to indicate a modulation scheme of N preset modulation schemes, and N is a positive integer.

Optionally, when multiple retransmitted data is transmitted on the second carrier, control signaling of each data may indicate whether the data belongs to the first carrier or the second carrier. Preferably, the control signaling of each data includes a new data indicator (NDI) field and an MCS field.

The NDI field is used to indicate whether the data is retransmitted data. When the NDI field indicates that retransmitted data is transmitted, the MCS field is used to indicate whether the data is retransmitted data on the first carrier or retransmitted data on the second carrier. When a value of the MCS field is any value in [0, 31−N], it represents that the data is retransmitted data on the first carrier, or when a value of the MCS field is any value in (31−N, 31], it represents that the data is retransmitted data on the second carrier. Further, optionally, each value in (31−N, 31] indicates a modulation scheme.

Optionally, in a first application scenario, when there are N preset modulation schemes, in the MCS field, each of N values in [0, 31−N] is used to indicate a modulation scheme. In this case, optionally, the control signaling further includes a CIF that is used to indicate a number of the first carrier of the data, that is, used to represent which carrier the data is from. Herein, it should be noted that the CIF may be added to all downlink control information (DCI), regardless of whether cross-carrier scheduling exists in the carrier. When self-scheduling is used for the carrier, the CIF indicates a number of the carrier.

Alternatively, optionally, in a second application scenario, when there are N preset modulation schemes, in the MCS field, in values in [0, 31−N], $N_1$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number. That is, a value of the MCS field is used to indicate a number of the first carrier and a modulation scheme for the data.

Optionally, in general cases, a modulation scheme may include quadrature phase shift keying (QPSK), 16 quadrature amplitude modulation (16QAM), and 64 quadrature amplitude modulation (64QAM), and may further include 256 quadrature amplitude modulation (256QAM). That is, in a preferred application scenario, a value of N may be 3 or 4.

Herein, a description is provided by using an example in which the modulation scheme includes four modulation schemes: QPSK, 16QAM, 64QAM, and 256QAM. In the prior art, when data is retransmitted, values [0, 27] of an MCS field are not defined, but only four values in [28, 31] are used to indicate the modulation scheme. However, in the present disclosure, when data is retransmitted, an unlicensed carrier is indicated by using a value in [0, 27] that is not defined. Not only it indicates a carrier on which the data is retransmitted, but also no new signaling overhead is added.

Referring to FIG. 2, FIG. 2 corresponds to the first application scenario. Optionally, any four values a, b, c, d in [0, 27] of the MCS field respectively correspond to the four modulation schemes QPSK, 16QAM, 64QAM, and 256QAM. For example, when the value of the MCS field is a, it represents that the data is retransmitted data on an unlicensed carrier, and a modulation scheme of the data is QPSK. Moreover, four values in [28, 31] of the MCS field respectively correspond to the four modulation schemes QPSK, 16QAM, 64QAM, and 256QAM. For example, when the value of the MCS field is 28, it represents that the data is retransmitted data on the second carrier, and a modulation scheme of the data is QPSK. Certainly, the description is provided herein by way of example only, and does not represent that the present disclosure is limited thereto.

Alternatively, referring to FIG. 3, FIG. 3 corresponds to the second application scenario. Optionally, each of all values in [0, 27] of the MCS field corresponds to one unlicensed carrier. [0, 6] corresponds to the modulation scheme QPSK, [7, 13] corresponds to the modulation scheme 16QAM, [14, 20] corresponds to the modulation scheme 64QAM, and [15, 27] corresponds to the modulation scheme 256QAM. For example, when the value of the MCS field is 15, it represents that the data is retransmitted data on an unlicensed carrier, a modulation scheme of the data is 64QAM, and the data is data on an unlicensed carrier 2. Four values in [28, 31] of the MCS field respectively correspond to the four modulation schemes: QPSK, 16QAM, 64QAM, and 256QAM. Certainly, the description is provided herein by way of example only, and does not represent that the present disclosure is limited thereto. In this way, according to the present disclosure, by means of a multiplexing manner, an MCS field in the prior art indicates whether data is from a local carrier or another carrier during data retransmission, avoiding a data receiving error caused by a fact that a receive end does not know which carrier the data is from.

According to the data retransmission method provided in this embodiment of the present disclosure, a first device transmits data to a second device by using a first carrier, where the first carrier is an unlicensed carrier; the first device retransmits the data to the second device by using a second carrier, where the first carrier and the second carrier are different carriers; and the first device sends control signaling to the second device, where the control signaling is used to indicate the data. The prior-art problem that when a device transmits data by using an unlicensed carrier, data retransmission cannot be performed because the device needs to re-preempt a channel is resolved.

Figure 4:
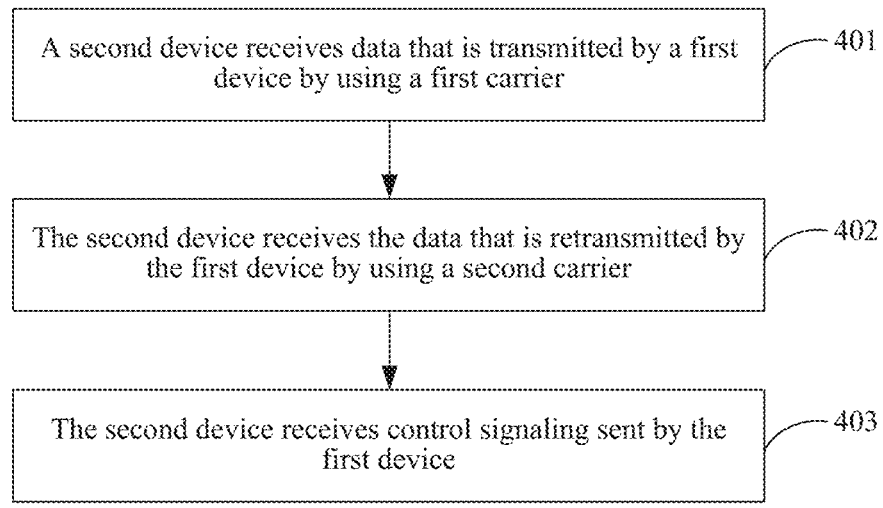
FIG. 4 is a schematic flowchart of a data retransmission method according to another embodiment of the present disclosure.

Another embodiment of the present disclosure provides a data retransmission method, corresponding to a receive end of the data retransmission method described in the embodiment shown in FIG. 1. Preferably, the method is applied to an LAA-LTE system or an LTE system. Referring to FIG. 4, the method includes the following steps.

401: A second device receives data that is transmitted by a first device by using a first carrier. The first carrier is an unlicensed carrier.

402: The second device receives the data that is retransmitted by the first device by using a second carrier. The first carrier and the second carrier are different carriers. Optionally, the second carrier may be a licensed carrier or an unlicensed carrier. Optionally, because the first device cannot always occupy an unlicensed carrier, after the first device occupies the unlicensed carrier for a particular time, the first device needs to re-preempt an unlicensed carrier. The first device may retransmit the data on the second carrier when the first device cannot retransmit the data on the first carrier, or the first device may retransmit the data on the second carrier when the first device still occupies the first carrier. This is not limited in the present disclosure.

403: The second device receives control signaling sent by the first device. The control signaling is used to indicate the data. Preferably, the second device receives the control signaling that is sent by the first device by using the second carrier.

Optionally, in an application scenario, the control signaling includes an MCS field, and when a value of the MCS field is any value in [0, 31−N], the MCS field is used to indicate the data, where N is a quantity of preset modulation schemes and is a positive integer.

Further, optionally, in all values in [0, 31−N], $N_1$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number.

Alternatively, optionally, in another application scenario, the control signaling includes a CIF. The CIF is used to indicate the data. The control signaling further includes an MCS field. The MCS field is used to indicate a modulation scheme for retransmitting the data. Optionally, the CIF is used to indicate a number of the first carrier, that is, used to represent which carrier the data is from.

Further, optionally, a value of the MCS field is any value in [0, 31−N], each value is used to indicate a modulation scheme of N preset modulation schemes, and N is a positive integer.

According to the data retransmission method provided in this embodiment of the present disclosure, a second device receives data that is transmitted by a first device by using a first carrier, where the first carrier is an unlicensed carrier; the second device receives the data that is retransmitted by the first device by using a second carrier, where the first carrier and the second carrier are different carriers; and the second device receives control signaling sent by the first device, where the control signaling is used to indicate the data. The prior-art problem that when a device transmits data by using an unlicensed carrier, data retransmission cannot be performed because the device needs to re-preempt a channel is resolved.

Figure 5:
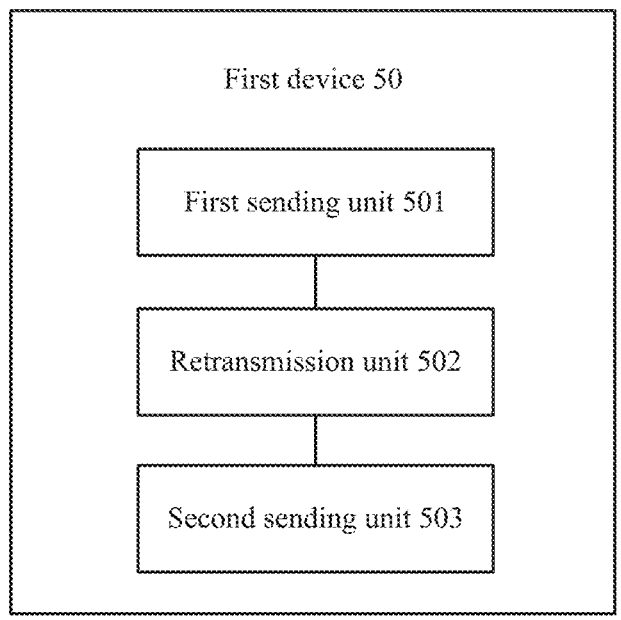
FIG. 5 is a schematic structural diagram of a first device according to an embodiment of the present disclosure.

Based on the embodiment corresponding to FIG. 1, an embodiment of the present disclosure provides a first device configured to perform the data retransmission method described in the embodiment corresponding to FIG. 1. Preferably, the first device is applied to an LAA-LTE system or an LTE system. Optionally, the first device may be a base station or user equipment. Referring to FIG. 5, the first device 50 includes a first sending unit 501, a retransmission unit 502, and a second sending unit 503.

The first sending unit 501 is configured to transmit data to a second device by using a first carrier, where the first carrier is an unlicensed carrier.

The retransmission unit 502 is configured to retransmit the data to the second device by using a second carrier, where the first carrier and the second carrier are different carriers.

Optionally, the second carrier may be a licensed carrier or an unlicensed carrier. Optionally, because the first device cannot always occupy an unlicensed carrier, after the first device occupies the unlicensed carrier for a particular time, the first device needs to re-preempt an unlicensed carrier. The first device may retransmit the data on the second carrier when the first device cannot retransmit the data on the first carrier, or the first device may retransmit the data on the second carrier when the first device still occupies the first carrier. This is not limited in the present disclosure.

The second sending unit 503 is configured to send control signaling to the second device, where the control signaling is used to indicate the data.

Optionally, the second sending unit 503 is specifically configured to send the control signaling to the second device by using the second carrier.

Optionally, in an application scenario, the control signaling includes an MCS field, and when a value of the MCS field is any value in [0, 31−N], the MCS field is used to indicate the data, where N is a quantity of preset modulation schemes and is a positive integer.

Further, optionally, in all values in [0, 31−N], $N_1$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number.

Alternatively, optionally, in another application scenario, the control signaling includes a CIF. The CIF is used to indicate the data. The control signaling further includes an MCS field. The MCS field is used to indicate a modulation scheme for retransmitting the data. Optionally, the CIF is used to indicate a number of the first carrier, that is, used to represent which carrier the data is from.

Further, optionally, a value of the MCS field is any value in [0, 31−N], each value is used to indicate a modulation scheme of N preset modulation schemes, and N is a positive integer.

According to the first device provided in this embodiment of the present disclosure, the first device transmits data to a second device by using a first carrier, where the first carrier is an unlicensed carrier; the first device retransmits the data to the second device by using a second carrier, where the first carrier and the second carrier are different carriers; and the first device sends control signaling to the second device, where the control signaling is used to indicate the data. The prior-art problem that when a device transmits data by using an unlicensed carrier, data retransmission cannot be performed because the device needs to re-preempt a channel is resolved.

Figure 6:
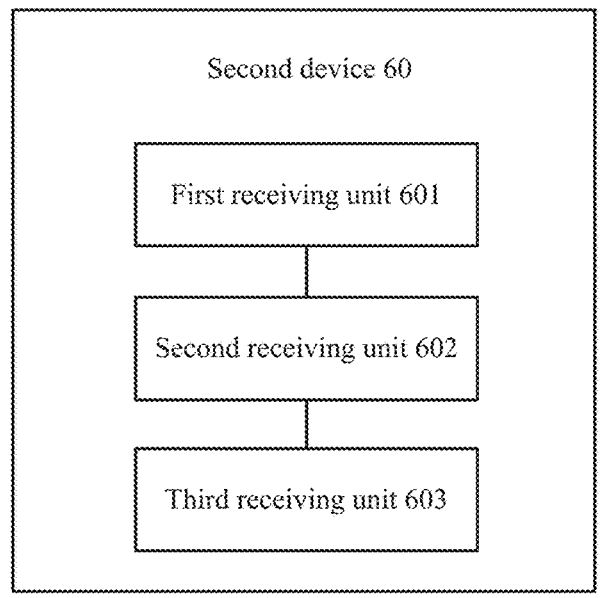
FIG. 6 is a schematic structural diagram of a second device according to an embodiment of the present disclosure.

Based on the embodiment corresponding to FIG. 4, an embodiment of the present disclosure provides a second device, configured to perform the data retransmission method described in the embodiment corresponding to FIG. 4. Preferably, the second device is applied to an LAA-LTE system or an LTE system. Optionally, the second device may be a base station or user equipment. Referring to FIG. 6, the second device 60 includes a first receiving unit 601, a second receiving unit 602, and a third receiving unit 603.

The first receiving unit 601 is configured to receive data that is transmitted by a first device by using a first carrier, where the first carrier is an unlicensed carrier. The second receiving unit 602 is configured to receive the data that is retransmitted by the first device by using a second carrier, where the first carrier and the second carrier are different carriers.

Optionally, the second carrier may be a licensed carrier or an unlicensed carrier. Optionally, because the first device cannot always occupy an unlicensed carrier, after the first device occupies the unlicensed carrier for a particular time, the first device needs to re-preempt an unlicensed carrier. The first device may retransmit the data on the second carrier when the first device cannot retransmit the data on the first carrier, or the first device may retransmit the data on the second carrier when the first device still occupies the first carrier. This is not limited in the present disclosure.

The third receiving unit 603 is configured to receive control signaling sent by the first device, where the control signaling is used to indicate the data.

Optionally, the third receiving unit 603 is specifically configured to receive the control signaling that is sent by the first device by using the second carrier.

Optionally, in an application scenario, the control signaling includes an MCS field, and when a value of the MCS field is any value in [0, 31−N], the MCS field is used to indicate the data, where N is a quantity of preset modulation schemes and is a positive integer.

Further, optionally, in all values in [0, 31−N], $N_1$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number.

Alternatively, optionally, in another application scenario, the control signaling includes a CIF. The CIF is used to indicate the data. The control signaling further includes an MCS field. The MCS field is used to indicate a modulation scheme for retransmitting the data. Optionally, the CIF is used to indicate a number of the first carrier, that is, used to represent which carrier the data is from.

Further, optionally, a value of the MCS field is any value in [0, 31−N], each value is used to indicate a modulation scheme of N preset modulation schemes, and N is a positive integer.

According to the second device provided in this embodiment of the present disclosure, the second device receives data that is transmitted by a first device by using a first carrier, where the first carrier is an unlicensed carrier; the second device receives the data that is retransmitted by the first device by using a second carrier, where the first carrier and the second carrier are different carriers; and the second device receives control signaling sent by the first device, where the control signaling is used to indicate the data. The prior-art problem that when a device transmits data by using an unlicensed carrier, data retransmission cannot be performed because the device needs to re-preempt a channel is resolved.

Figure 7:
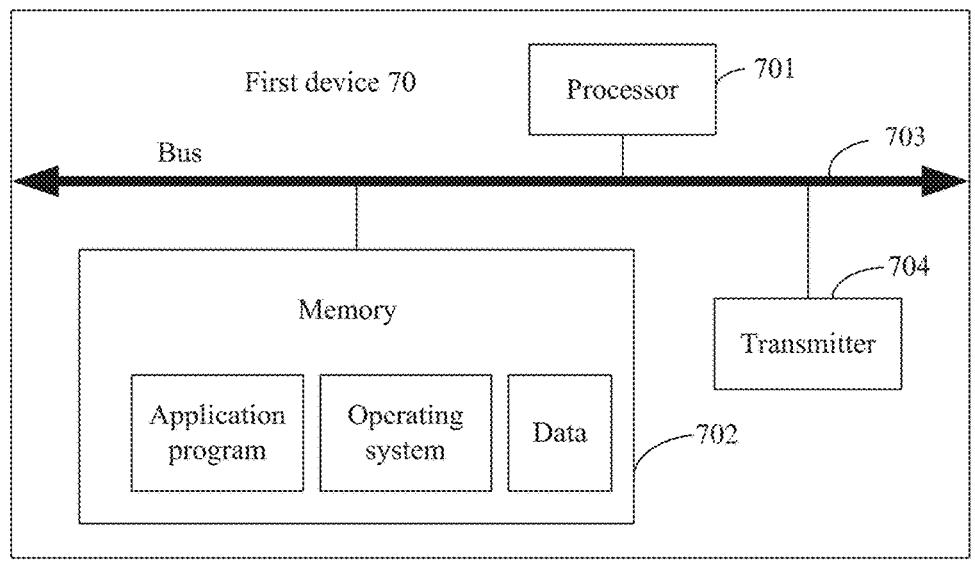
FIG. 7 is a schematic structural diagram of a first device according to another embodiment of the present disclosure.

Based on the embodiment corresponding to FIG. 1, another embodiment of the present disclosure provides a first device, configured to perform the data retransmission method described in the embodiment corresponding to FIG. 1. Preferably, the first device is applied to an LAA-LTE system or an LTE system. Optionally, the first device may be a base station or user equipment. Referring to FIG. 7, the first device 70 includes at least one processor 701, a memory 702, a bus 703, and a transmitter 704. The at least one processor 701, the memory 702, and the transmitter 704 are connected and implement mutual communication by using the bus 703.

The bus 703 may be an industry standard architecture (ISA) bus, a peripheral component interconnect (PCI) bus, an extended industry standard architecture (EISA) bus, or the like. The bus 703 may be classified into an address bus, a data bus, a control bus, and the like. For ease of representation, the bus 703 is represented in FIG. 7 by using only one bold line, but it does not indicate that there is only one bus or only one type of bus. In the drawings.

The memory 702 is configured to program code for executing the solution of the present disclosure. The program code for executing the solution of the present disclosure is stored in the memory, and is controlled and executed by the processor 701.

The memory may be a read-only memory (ROM) or a static storage device of another type that can store static information and an instruction; a random access memory (RAM) or a dynamic storage device of another type that can store static information and an instruction; or an electrically erasable programmable read-only memory (EEPROM), a compact disc read-only memory (CD-ROM) or another compact-disc storage, an optical disc (including compressed disc, laser disk, optical disc, digital general optical disc, Blu-ray disc, or the like) storage, magnetic disk storage medium or another magnetic storage device, or any other media that can be used to carry or store program code having expectations with an instruction or data structural manner and can be accessed by a computer, but is not limited thereto. These memories are connected to the processor by using the bus.

The processor 701 may be a central processing unit (CPU), an application-specific integrated circuit (ASIC), or one or more integrated circuits configured to implement this embodiment of the present disclosure.

The processor 701 is configured to invoke the program code in the memory 702. In a possible implementation, when the foregoing application program is executed by the processor 701, the following functions are implemented.

The processor 701 is configured to transmit, by using the transmitter 704, data to a second device by using a first carrier, where the first carrier is an unlicensed carrier.

The processor 701 is further configured to retransmit, by using the transmitter 704, the data to the second device by using a second carrier, where the first carrier and the second carrier are different carriers.

Optionally, the second carrier may be a licensed carrier or an unlicensed carrier. Optionally, because the first device cannot always occupy an unlicensed carrier, after the first device occupies the unlicensed carrier for a particular time, the first device needs to re-preempt an unlicensed carrier.

The first device may retransmit the data on the second carrier when the first device cannot retransmit the data on the first carrier, or the first device may retransmit the data on the second carrier when the first device still occupies the first carrier. This is not limited in the present disclosure.

The processor 701 is further configured to send control signaling to the second device by using the transmitter 704, where the control signaling is used to indicate the data. Optionally, the processor 701 is specifically configured to send, by using the transmitter 704, the control signaling to the second device by using the second carrier.

Optionally, in an application scenario, the control signaling includes an MCS field, and when a value of the MCS field is any value in [0, 31−N], the MCS field is used to indicate the data, where N is a quantity of preset modulation schemes and is a positive integer.

Further, optionally, in all values in [0, 31−N], $N_1$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number.

Alternatively, optionally, in another application scenario, the control signaling includes a CIF. The CIF is used to indicate the data. The control signaling further includes an MCS field. The MCS field is used to indicate a modulation scheme for retransmitting the data. Optionally, the CIF is used to indicate a number of the first carrier, that is, used to represent which carrier the data is from.

Further, optionally, a value of the MCS field is any value in [0, 31−N], each value is used to indicate a modulation scheme of N preset modulation schemes, and N is a positive integer.

According to the first device provided in this embodiment of the present disclosure, the first device transmits data to a second device by using a first carrier, where the first carrier is an unlicensed carrier; the first device retransmits the data to the second device by using a second carrier, where the first carrier and the second carrier are different carriers; and the first device sends control signaling to the second device, where the control signaling is used to indicate the data. The prior-art problem that when a device transmits data by using an unlicensed carrier, data retransmission cannot be performed because the device needs to re-preempt a channel is resolved.

Figure 8:
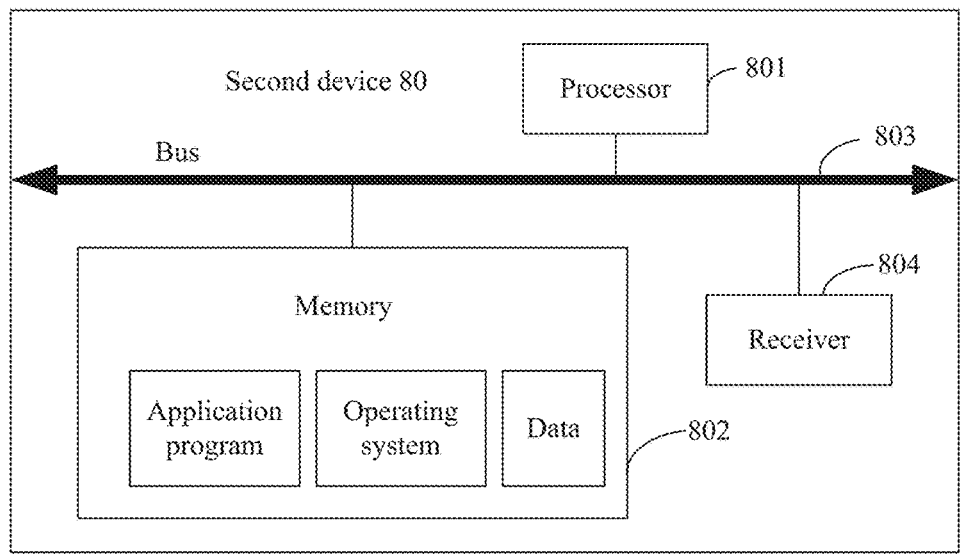
FIG. 8 is a schematic structural diagram of a second device according to another embodiment of the present disclosure.

Based on the embodiment corresponding to FIG. 4, another embodiment of the present disclosure provides a second device, configured to perform the data retransmission method described in the embodiment corresponding to FIG. 4. Preferably, the second device is applied to an LAA-LTE system or an LTE system. Optionally, the second device may be a base station or user equipment. Referring to FIG. 8, the second device 80 includes at least one processor 801, a memory 802, a bus 803, and a receiver 804. The at least one processor 801, the memory 802, and the receiver 804 are connected and implement mutual communication by using the bus 803.

The bus 803 may be an ISA bus, a PCI bus, an EISA bus, or the like. The bus 803 may be classified into an address bus, a data bus, a control bus, and the like. For ease of representation, the bus 803 is represented in FIG. 8 by using only one bold line, but it does not indicate that there is only one bus or only one type of bus. In the drawings.

The memory 802 is configured to program code for executing the solution of the present disclosure. The program code for executing the solution of the present disclosure is stored in the memory, and is controlled and executed by the processor 801.

The memory may be a ROM or a static storage device of another type that can store static information and an instruction; a RAM or a dynamic storage device of another type that can store static information and an instruction; or an EEPROM, a CD-ROM or another compact-disc storage, an optical disc (including compressed disc, laser disk, optical disc, digital general optical disc, Blu-ray disc, or the like) storage, magnetic disk storage medium or another magnetic storage device, or any other media that can be used to carry or store program code having expectations with an instruction or data structural manner and can be accessed by a computer, but is not limited thereto. These memories are connected to the processor by using the bus.

The processor 801 may be a CPU, an ASIC, or one or more integrated circuits configured to implement this embodiment of the present disclosure.

The processor 801 is configured to invoke the program code in the memory 802. In a possible implementation, when the foregoing application program is executed by the processor 801, the following functions are implemented.

The processor 801 is configured to receive, by using the receiver 804, data that is transmitted by a first device by using a first carrier, where the first carrier is an unlicensed carrier.

The processor 801 is further configured to receive, by using the receiver 804, the data that is retransmitted by the first device by using a second carrier, where the first carrier and the second carrier are different carriers.

Optionally, the second carrier may be a licensed carrier or an unlicensed carrier. Optionally, because the first device cannot always occupy an unlicensed carrier, after the first device occupies the unlicensed carrier for a particular time, the first device needs to re-preempt an unlicensed carrier. The first device may retransmit the data on the second carrier when the first device cannot retransmit the data on the first carrier, or the first device may retransmit the data on the second carrier when the first device still occupies the first carrier. This is not limited in the present disclosure.

The processor 801 is further configured to receive, by using the receiver 804, control signaling sent by the first device, where the control signaling is used to indicate the data.

Optionally, the processor 801 is specifically configured to receive, by using the receiver 804, the control signaling that is sent by the first device by using the second carrier. Optionally, in an application scenario, the control signaling includes an MCS field, and when a value of the MCS field is any value in [0, 31−N], the MCS field is used to indicate the data, where N is a quantity of preset modulation schemes and is a positive integer.

Further, optionally, in all values in [0, 31−N], $N_1$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number.

Alternatively, optionally, in another application scenario, the control signaling includes a CIF. The CIF is used to indicate the data. The control signaling further includes an MCS field. The MCS field is used to indicate a modulation scheme for retransmitting the data. Optionally, the CIF is used to indicate a number of the first carrier, that is, used to represent which carrier the data is from.

Further, optionally, a value of the MCS field is any value in [0, 31−N], each value is used to indicate a modulation scheme of N preset modulation schemes, and N is a positive integer.

According to the second device provided in this embodiment of the present disclosure, the second device receives data that is transmitted by a first device by using a first carrier, where the first carrier is an unlicensed carrier; the second device receives the data that is retransmitted by the first device by using a second carrier, where the first carrier and the second carrier are different carriers; and the second device receives control signaling sent by the first device, where the control signaling is used to indicate the data. The prior-art problem that when a device transmits data by using an unlicensed carrier, data retransmission cannot be performed because the device needs to re-preempt a channel is resolved.

Figure 9:
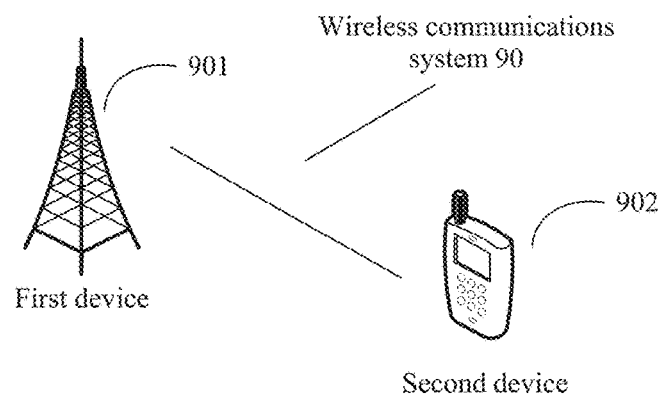
FIG. 9 is a schematic structural diagram of a wireless communications system according to an embodiment of the present disclosure.

Based on the embodiments corresponding to FIG. 1 and FIG. 4, an embodiment of the present disclosure provides a wireless communications system, configured to perform the data retransmission method described in the embodiments corresponding to FIG. 1 and FIG. 4. Preferably, the wireless communications system is applied to an LAA-LTE system or an LTE system. Referring to FIG. 9, the wireless communications system 90 includes a first device 901 and a second device 902.

The first device 901 is the first device described in the embodiment corresponding to FIG. 5, and the second device 902 is the first device described in the embodiment corresponding to FIG. 6.

Alternatively, the first device 901 is the first device described in the embodiment corresponding to FIG. 7, and the second device 902 is the first device described in the embodiment corresponding to FIG. 8.

Preferably, the first device may be a base station, and the second device may be user equipment, or the first device may be user equipment, and the second device is a base station.

According to the wireless communications system provided in this embodiment of the present disclosure, the first device transmits data to the second device by using a first carrier, where the first carrier is an unlicensed carrier; the first device retransmits the data to the second device by using a second carrier, where the first carrier and the second carrier are different carriers; and the first device sends control signaling to the second device, where the control signaling is used to indicate the data. The prior-art problem that when a device transmits data by using an unlicensed carrier, data retransmission cannot be performed because the device needs to re-preempt a channel is resolved.

In addition, a computer readable medium (or a medium) is further provided, and includes a computer readable instruction, where when the computer readable instruction is executed, the following operations are performed: performing the operations of step 101 to step 103 or step 401 to step 403 of the method in the foregoing embodiment.

In addition, a computer program product is further provided, including the foregoing computer readable medium.

It should be noted that the signaling mentioned in the specification includes, but is not limited to, an indication, information, a signal, or a message, and this is not limited herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data retransmission method, comprising:
transmitting, by a first device and using a first unlicensed carrier, data to a second device;
retransmitting, by the first device and using a second unlicensed carrier that is different than the first unlicensed carrier, the data to the second device; and
subsequent to transmitting the data using the first unlicensed carrier, sending, to the second device by the first device via the second unlicensed carrier, control signaling used to indicate the data, wherein the control signaling includes a modulation and coding scheme (MCS) field that indicates a modulation scheme for the data retransmitted via the second unlicensed carrier and that the data is retransmitted via the second unlicensed carrier, wherein the MCS field can be populated with any one of 32 possible values, wherein a first plurality of sequential values of the MCS field in the range of [0, 31−N] corresponds to a first predetermined modulation scheme, wherein a second plurality of sequential values of the MCS field in the range of [0, 31−N] corresponds to a second predetermined modulation scheme, wherein each of the first plurality of sequential values corresponds to a respective carrier of a plurality of carriers according to a sequence, wherein each of the second plurality of sequential values corresponds to a respective carrier of the plurality of carriers according to the sequence such that a first value in the first plurality of sequential values and a first value in the second plurality of sequential values correspond to a first predetermined carrier, and such that a second value in the first plurality of sequential values and a second value in the second plurality of sequential values correspond to a second predetermined carrier.

2. The method of claim 1, wherein when a value of the MCS field is any value in [0, 31−N], the MCS field is used to indicate the data, and wherein N is a quantity of preset modulation schemes and is a positive integer.

3. The method of claim 2, wherein in all values in [0, 31−N], $N_1$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number.

4. The method of claim 1, wherein the control signaling comprises a carrier indicator field (CIF) used to indicate the data.

5. The method of claim 4, wherein each value is used to indicate a modulation scheme of N preset modulation schemes, and N is a positive integer.

6. A data retransmission method, comprising:
receiving, by a second device via a first unlicensed carrier, first data from a first device;
receiving, by the second device via a second unlicensed carrier that is different than the first unlicensed carrier, retransmitted data from the first device, the retransmitted data corresponding to the first data; and
subsequent to receiving the first data via the first unlicensed carrier, receiving, by the second device from the first device via the second unlicensed carrier, control signaling used to indicate the retransmitted data, wherein the control signaling includes a modulation and coding scheme (MCS) field that indicates a modulation scheme for the data retransmitted via the second unlicensed carrier and that the data is retransmitted via the second unlicensed carrier, wherein the MCS field can be populated with any one of 32 possible values, wherein a first plurality of sequential values of the MCS field in the range of [0, 31−N] corresponds to a first predetermined modulation scheme, wherein a second plurality of sequential values of the MCS field in the range of [0, 31−N] corresponds to a second predetermined modulation scheme, wherein each of the first plurality of sequential values corresponds to a respective carrier of a plurality of carriers according to a sequence, wherein each of the second plurality of sequential values corresponds to a respective carrier of the plurality of carriers according to the sequence such that a first value in the first plurality of sequential values and a first value in the second plurality of sequential values correspond to a first predetermined carrier, and such that a second value in the first plurality of sequential values and a second value in the second plurality of sequential values correspond to a second predetermined carrier.

7. The method of claim 6, wherein the MCS field is used to indicate the data, and wherein N is a quantity of preset modulation schemes and is a positive integer.

8. The method of claim 7, wherein in all values in [0, 31−N], $N_1$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number.

9. The method of claim 6, wherein the control signaling comprises a carrier indicator field (CIF) used to indicate the data.

10. A first device, comprising:
a processor;
a memory;
a bus; and
a transmitter,
the processor, the memory, and the transmitter being connected to, and being configured to communicate with, each other using the bus, and
the processor being configured to:
   transmit, using the transmitter, data to a second device using a first unlicensed carrier;
   retransmit, using the transmitter, the data to the second device using a second unlicensed carrier that is different than the first unlicensed carrier; and
   send, to the second device via the second unlicensed carrier and subsequent to the transmission of the data using the first unlicensed carrier, control signaling used to indicate the data, wherein the control signaling includes a modulation and coding scheme (MCS) field that indicates a modulation scheme for the data retransmitted via the second unlicensed carrier and that the data is retransmitted via the second unlicensed carrier, wherein the MCS field can be populated with any one of 32 possible values, wherein a first plurality of sequential values of the MCS field in the range of [0, 31−N] corresponds to a first predetermined modulation scheme, wherein a second plurality of sequential values of the MCS field in the range of [0, 31−N] corresponds to a second predetermined modulation scheme, wherein each of the first plurality of sequential values corresponds to a respective carrier of a plurality of carriers according to a sequence, wherein each of the second plurality of sequential values corresponds to a respective carrier of the plurality of carriers according to the sequence such that a first value in the first plurality of sequential values and a first value in the second plurality of sequential values correspond to a first predetermined carrier, and such that a second value in the first plurality of sequential values and a second value in the second plurality of sequential values correspond to a second predetermined carrier.

11. The first device of claim 10, wherein when a value of the MCS field is any value in [0, 31−N], the MCS field is used to indicate the data, and wherein N is a quantity of preset modulation schemes and is a positive integer.

12. The first device of claim 10, wherein in all values in [0, 31−N], $N_1$ values are used to indicate a first modulation scheme, $N_i$ values are used to indicate an $i^{th}$ modulation scheme, $$\sum_{i=1}^{N} N_i = 32 - N,$$

$N_i$ is a positive integer, and each of the $N_i$ values is used to indicate a carrier number.

* * * * *